Feb. 25, 1969 H. W. BAKER 3,429,682
METHOD FOR TOUGHENING SHEETS OF GLASS
Original Filed March 16, 1965

Inventor
Henry Wellwood Baker
By
Morrison, Kennedy & Campbell Attorneys

United States Patent Office 3,429,682
Patented Feb. 25, 1969

3,429,682
METHOD FOR TOUGHENING
SHEETS OF GLASS
Henry W. Baker, Birmingham, England, assignor to Pilkington Brothers Limited, Liverpool, England, a company of Great Britain
Original application Mar. 16, 1965, Ser. No. 440,258, now Patent No. 3,363,936, dated Jan. 16, 1968. Divided and this application Nov. 21, 1967, Ser. No. 684,784
Claims priority, application Great Britain, Mar. 24, 1964, 12,498/64
The portion of the term of the patent subsequent to June 1, 1985, has been disclaimed and dedicated to the Public
U.S. Cl. 65—115                                        3 Claims
Int. Cl. C03c 27/00

ABSTRACT OF THE DISCLOSURE

A method of producing a sheet of toughened glass for use as windscreens in an automobile comprises interposing, in the paths of a gaseous chilling medium directed towards both faces of a heated glass sheet in that part of the glass sheet intended to form a vision zone, a continuous frame and a series of parallel strip-like members sloped angularly outwardly with respect to the edge of the glass sheet which will be the upper edge when the toughened glass sheet is used as a windscreen in an automobile.

BACKGROUND OF THE INVENTION

Field of the invention

This application is divided from application Ser. No. 440,258, now Patent No. 3,363,936, and relates to methods of producing toughened sheets of glass.

Description of the prior art

It is known to toughen sheets of glass so that when the glass is fractured, the presence of sharp cutting edges of glass is avoided. It is also known to produce in a toughened glass sheet for use, for example, as the windscreen of an automobile, areas of glass having different degrees of toughening so that when the sheet of glass is fractured a proportion of the glass will contain larger particles which will give a better visibility than the visibility obtainable through fine fracture particles formed on fracture of highly toughened glass.

In co-pending U.S. patent application Nos. 373,971, now Patent No. 3,364,006; 373,974, now abandoned, and 431,797, now Patent No. 3,396,001, methods have been described of producing a toughened glass sheet of which an area persists as a vision zone comprising regions of glass which are toughened to a relatively low degree, separated from one another by more highly toughened regions of glass. In the preferred embodiments in each of the said co-pending patent applications, the regions are strips of glass extending in the transverse direction of the toughened glass sheet.

It is a main object of the present invention to provide a method of producing a new and improved toughening glass sheet comprising zones of alternate coarse fracturing and fine fracturing glass, and particularly suitable for use as the windscreen of an automobile.

As already mentioned, in the examples illustrated in the said co-pending patent applications the alternate areas of fine and coarse fracturing glass are in the form of elongated strips of glass arranged transversely of the screen so that when broken they form bands of fine and coarse fracture patterns. As a result, there are in front of the driver of a car or other automobile whose windscreen is fractured comparatively clear areas of glass through which sufficient vision is available for him to control the car with adequate vision of the road ahead.

If, however, there is a vehicle or other obstruction in front of and to the near side of his car, the driver's view towards that obstruction obliquely through part of the shattered windscreen on the passenger's side of the car is not so good as the driver's view straight ahead. This is because the driver is looking obliquely through the elongated strips of coarse and fine fracture particles extending transversely to the windscreen, and this undesirable effect is particularly noticeable in the case of a car windscreen which is raked back at an angle, for example, 30° or 35° or more from the vertical.

SUMMARY

The present applicant has found that if the alternate areas of glass on the passenger's side of the windscreen are arranged in the glass sloping downwardly and outwardly at an angle, for example, of about 30°, they will, when viewed from the position of the driver, be foreshortened and appear to be comparatively vertical, and consequently the driver's view of any obstruction through that part of the windscreen will be considerably better than when the alternate areas are arranged transversely of the screen. On the other hand, the driver's view straight ahead will not be materially altered by inclining the alternate areas of glass in front of him up to an angle of about 35°, because the driver will be looking more directly through the glass windscreen when he is viewing the road ahead.

According to the present invention there is provided a method of producing a sheet of toughened glass for use in a windscreen of an automobile and having a highly toughened peripheral zone and a viewing zone on at least one side of a central line extending between the upper and lower edges of the windscreen and separated from said peripheral zone by a continuous demarcation zone toughened to a lesser degree than the peripheral zone, said method comprising exposing said heated glass sheet to the action of a quenching medium simultaneously and uniformly distributed onto both faces of the glass sheet, and interposing in the path of the quenching medium directed towards that part of the glass sheet intended to form the viewing zone a continuous frame defining within it the intended viewing zone and a series of parallel strip-like members in spaced relation disposed across the viewing zone on at least one side of said central line each of said strips being inclined downwardly at an obtuse angle to hte upper edge of the glass sheet which edge will form the upper edge of the glass sheet when used as an automobile windscreen, whereby said demarcation zone and said elongated areas toughened alternately to a higher and a lesser degree of toughening are formed in said sheet within said peripheral zone.

Preferably each frame and its series of strip-like members are disposed during the quenching in an imaginary surface substantially parallel to a surface of the glass sheet.

Preferably each of the frames on opposite sides of said sheet defines within it the intended viewing zone on each side of the said central line and has its series of strip-like members downwardly and outwardly inclined on the opposite sides of said central line.

DESCRIPTION OF THE PREFERRED EMBODIMENT

Figure 1:
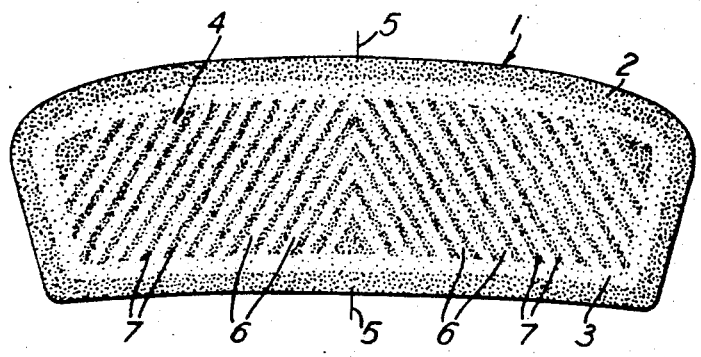
FIGURE 1 is a view of a fractured automobile windscreen in accordance with the present invention, the fracture pattern obtained indicating the toughening pattern present in the windscreen.

In the drawings, like reference numerals designate the same or similar parts.

With reference to FIGURE 1 of the accompanying drawings, there is indicated at 1 an automobile windscreen which comprises a sheet of toughened glass. The automobile windscreen 1 is shown as a fractured windscreen and the windscreen includes a continuous peripheral region 2 which is toughened to a first or high degree of toughening and which yields on fracture a particle count of the order of 20 particles per square inch or more.

Contiguous with the said continuous peripheral region 2 is an annular demarcation region 3 which is toughened to a lesser degree than the continuous peripheral region, and the annular demarcation region 3 yields on fracture of the glass sheet particles up to, but generally not exceeding, 1 square inch in area. Within said annular demarcation region 3 there is a central area 4 which is effectively divided into two equal parts by a line 5 extending transversely through the center of the glass sheet. Each of the parts comprising the central area of the glass sheet includes a series of strips 6 of glass which are toughened to a lesser degree of toughening than the continuous peripheral region 2. The strips 6 are advantageously toughened to an extent similar to the degree of toughening in the annular demarcation region 3.

The strips 6 are separated from one another by strips 7 of more highly toughened glass, and the strips 7 are advantageously toughened to an extent to give, on fracture, particles compatible with a particle count in excess of about 15 per square inch.

The respective strips 6 and 7 are both arranged in series of parallel strips in each part of the central area of the windscreen and the strips are all inclined at an angle of approximately 30° to a normal drawn through the upper edge of the windscreen at a point where any individual strip, if extended, would reach the upper edge of the windscreen. Another aspect is that each strip would, if extended, meet the upper edge at an obtuse angle of about 120°. The strips 6 and 7 extend downwardly and outwardly in relation to the upper edge of the windscreen and to the parts of the continuous peripheral region and the annular demarcation zone near the upper edge of the windscreen.

Frequently the automobile windscreen will comprise a curved sheet of toughened glass, for example curved to form a "wrap-around" windscreen.

Figure 2:
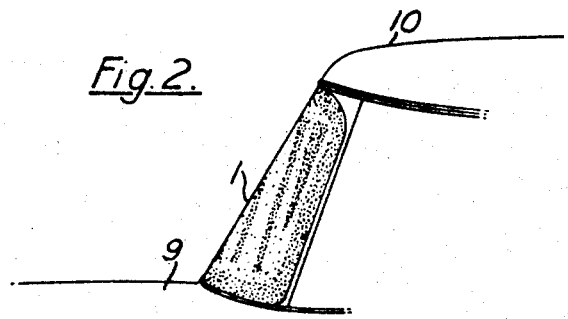
FIGURE 2 is a fragmentary side view of a portion of an automobile containing the windscreen of FIGURE 1 installed in the automobile.

In FIGURE 2 of the accompanying drawings, there is shown a fragmentary side view of a portion of a car containing such a curved windscreen 1 having a fracture pattern similar to the fracture pattern described with reference to FIGURE 1. The fragmentary view of FIGURE 2 indicates at 9 the upper outline of the bonnet of the car and at 10 the outline of the roof of the car. It will be observed that the windscreen 1 is mounted in the car so that the windscreen is raked back at an angle of approximately 35° to the vertical.

Figure 3:
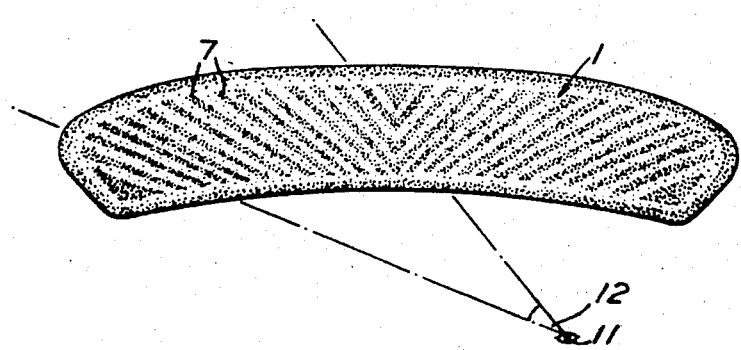
FIGURE 3 is a plan view of the windscreen of FIGURE 1 in the position in which it would be mounted in an automobile, for example the automobile of FIGURE 2.

FIGURE 3 of the accompanying drawings is a diagrammatic drawing showing only the plan view of the windscreen 1 mounted in the car of FIGURE 2 and the eye position 11 of the driver of the car in the case when the car has a right-hand drive in accordance with the general practice in the United Kingdom.

The present invention is primarily concerned with the view which the driver has through the part of the windscreen on the passenger's side of the windscreen and the approximate limits of the view through this part of the windscreen are indicated by the angle 12 in FIGURE 3.

Owing to the curvature of the windscreen 1 the strips 7 of fine fracturing particles which occur on fracture of the windscreen in the strips of more highly toughened glass in the central area of the windscreen do not appear exactly parallel to one another from the eye position 11 of the driver of the car, although these strips are parallel when the windscreen is viewed from directly ahead as indicated in FIGURE 1. However, the angle of inclination of the strips 7 is so designed that throughout the whole of the angle 12 the driver, from his eye position 11, will see the strips 7 of fine fracture particles as substantially vertical with portions of windscreens giving a clear vision to the front near-side of the car.

Figure 4:
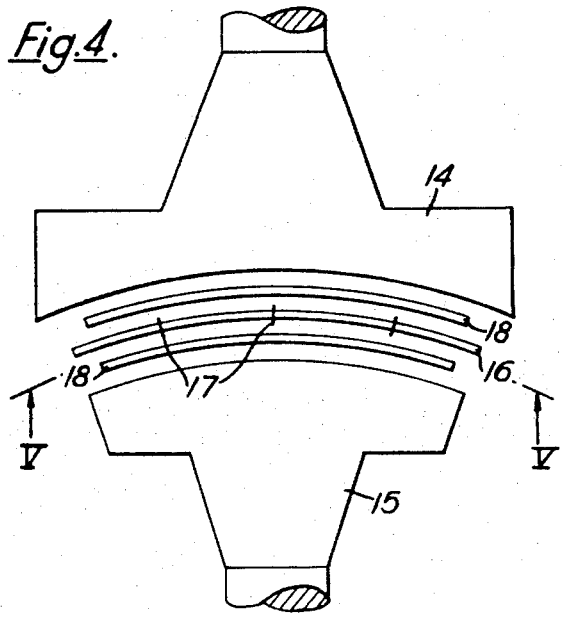
FIGURE 4 is a plan view of apparatus for manufacturing an automobile windscreen in accordance with the present invention.
Figure 5:
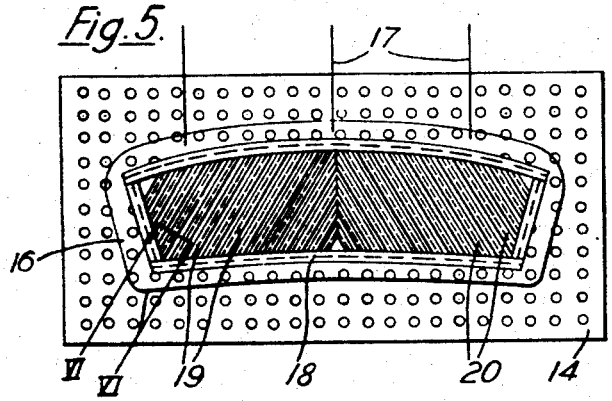
FIGURE 5 is a view of the apparatus according to FIGURE 4, including a heated glass sheet, the view being taken along the line V—V of FIGURE 4.

In FIGURES 4 and 5 there are shown respectively plan and elevational views of apparatus for producing a windscreen in accordance with the present invention and so toughened that it will yield on fracture a pattern similar to that shown in FIGURE 1. The method for producing the sheet of toughened glass which comprises the windscreen will be described with reference to FIGURES 4 and 5 of the accompanying drawings.

In FIGURES 4 and 5 there are shown opposed quenching units comprising air boxes 14 and 15 having their faces curved to conform with the curvature of the bent glass sheet 16 supported in position to be toughened between them. Conveniently the bent glass sheet 15 is carried by tongs 17, and preferably the bent glass sheet 16 is a uniformly heated glass sheet.

As indicated in FIGURE 5, the surfaces of the air boxes facing the glass sheet contain a considerable number of perforations or nozzles so that cold air may issue therefrom towards the uniformly heated glass sheet 16. Means, not shown, are provided for giving the air boxes 14 and 15 a movement of small amplitude in the mean plane of their opposed surfaces so as to distribute the cooling effect of the air jets over the surfaces of the glass in known manner.

Interposed between the perforated faces of the air boxes 14 and 15 and the surfaces of the glass sheet 16 and equidistant from the latter are two annular metal frames 18, each carrying two series of parallel strip-like members comprised respectively by the angle bars 19 and 20. Each series of the parallel strip-like members 19 and 20 is inclined downwardly and outwardly with respect to the edge of the glass sheet which will be the upper edge when the glass sheet is mounted as a windscreen in an automobile. Conveniently the annular metal frames 18 are of the same cross-section as the angle bars 19 and 20, and are made by fixing top and bottom horizontal members adjacent vertical or inclined members.

Figure 6:
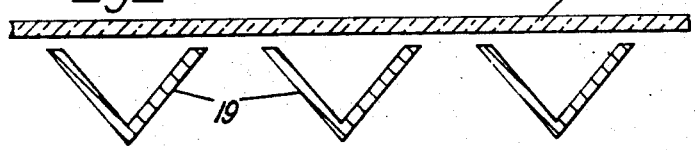
FIGURE 6 shows an enlarged cross-sectional view of one set of angle bars taken along the line VI—VI of FIGURE 5.

The parallel strip-like members 19 (shown in detail in FIGURE 6) and 20 carried by one annular metal frame 18 are directly opposed to the corresponding parallel strip-like members 19 and 20 carried by the annular metal frame 18 on the opposite side of the glass sheet 16 so that the corresponding parts of corresponding strip-like members 19 or 20 lie on a radius of the part of the curved glass sheet to which they are nearest.

Air at ambient temperature is forced by fans into the air boxes 14 and 15 at a pressure of about 10″ to 12″ water gauge and the flow of the gaseous chilling air from the air boxes 14 and 15 towards the central part of the uniformly heated glass sheet 16 positioned between the air boxes is interrupted by deflection of the chilling air by the angle bars 19 and 20. Also the chilling air directed at the portions of the glass sheet 16 shielded by the annular frame 18 is interrupted and there are consequently formed in the glass sheet an annular demarcation zone having a lesser degree of toughening than the peripheral region of the glass sheet and within the demarcation zone a central area having parallel inclined strip-like regions of glass toughened alternately to a higher and lower degree.

The method just described employing the apparatus shown in FIGURES 4 and 5 provides a toughened glass sheet 1 similar to that shown in FIGURE 1. The strip-like regions 6 and 7 may be of equal or unequal width as desired by suitable variation of the size of the interposing members which are the angle bars 19 and 20 and of the spacing between these bars 19 and 20. Preferably the fine fracturing regions or strips 7 are narrow in relation to the regions or strips 6.

A toughened glass sheet as illustrated in the preferred embodiment of the invention and having an annular region 3 of glass toughened to a lesser extent than the continuous peripheral region does provide a line of demarcation between the central area and the continuous peripheral region 2 of the glass sheet and this provides the advantage of a reduction in the tendency for fan-shaped fracture patterns to occur.

If desired, the spaces between the angle bars 19 and 20 may be partially obstructed by a wire gauze, for example there may be secured to the annular frame 18 and the angle bars 19 and 20 a sheet of metal gauze of 32 S.W.G. wire woven 30 to the inch to lessen the degree of toughening in the parts of the vision zone which are not directly shielded by the angle bars 19 and 20.

When a windscreen with a symmetrical vision zone is raked back at an angle as large as, for example, 45°, it is found that highly toughened strips formed upon fracture at such an angle as to appear substantially vertical when viewed obliquely across the car seriously impede the view of the driver when looking straight ahead. Accordingly in a windscreen which is to be raked back at such an angle and which is to be made symmetrical so that it is adapted for use with equal facility in a car with a right-hand drive or a left-hand drive, a compromise is reached to ensure reasonable visibility both directly ahead and to the side. The present invention comprehends such a compromise in which the strips of highly toughened glass on the passenger's side of the vehicle will appear to the driver to be at a slight angle to the vertical.

I claim:

1. A method of producing a sheet of toughened glass for use in a windscreen of an automobile and having a highly toughened peripheral zone and a viewing zone on at least one side of a central line extending between the upper and lower edges of the windscreen and separated from said peripheral zone by a continuous demarcation zone toughened to a lesser degree than the peripheral zone, said method comprising exposing said heated glass sheet to the action of a quenching medium simultaneously and uniformly distributed onto both faces of the glass sheet, and interposing in the path of the quenching medium directed towards that part of the glass sheet intended to form the viewing zone a continuous frame having substantially the contour of the peripheral zone of the windscreen and defining within it the intended viewing zone and a series of parallel strip-like members in spaced relation disposed across the viewing zone on at least one side of said central line each of said strips being inclined downwardly at an obtuse angle to the upper edge of the glass sheet which edge will form the upper edge of the glass sheet when used as an automobile windscreen, whereby said demarcation zone and said elongated areas toughened alternately to a higher and a lesser degree of toughening are formed in said sheet within said peripheral zone.

2. A method according to claim 1, wherein each frame and its series of strip-like members are disposed during the quenching in an imaginary surface substantially parallel to a surface of the glass sheet.

3. A method according to claim 1, wherein each of said frames on opposite sides of said sheet defines within it the intended viewing zone on each side of the said central line and has its series of strip-like members downwardly and outwardly inclined on the opposite sides of said central line.

References Cited

UNITED STATES PATENTS

| | | | |
|---|---|---|---|
| 2,213,405 | 9/1940 | Paddock | 65—349 |
| 3,174,840 | 3/1965 | Long | 65—351 X |
| 3,364,006 | 1/1968 | Newell et al. | 65—288 X |

DONALL H. SYLVESTER, *Primary Examiner.*

ARTHUR D. KELLOGG, *Assistant Examiner.*

U.S. Cl. X.R.

65—103, 104, 288, 351